(12) United States Patent
Nagao

(10) Patent No.: US 8,943,006 B2
(45) Date of Patent: Jan. 27, 2015

(54) AUTOMATON DETERMINIZATION METHOD, DEVICE, AND COMPUTER PROGRAM PRODUCT THAT INVOLVES A PLURALITY OF STATES AND DELETING STATES THAT ARE NEXT STATES TO FIRST TRANSITIONS

(75) Inventor: Manabu Nagao, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 292 days.

(21) Appl. No.: 13/533,261

(22) Filed: Jun. 26, 2012

(65) Prior Publication Data

US 2013/0073503 A1    Mar. 21, 2013

(30) Foreign Application Priority Data

Sep. 16, 2011    (JP) .................. 2011-203183

(51) Int. Cl.
  *G06F 15/18*    (2006.01)
  *G10L 15/08*    (2006.01)
  *G10L 15/193*    (2013.01)
(52) U.S. Cl.
  CPC .............. *G10L 15/083* (2013.01); *G10L 15/193* (2013.01)
  USPC ......................................................... 706/12
(58) Field of Classification Search
  USPC .............................................. 706/12, 45, 62
  See application file for complete search history.

(56) References Cited

U.S. PATENT DOCUMENTS

| | | | |
|---|---|---|---|
| 6,243,679 B1 | 6/2001 | Mohri et al. | |
| 6,456,971 B1 | 9/2002 | Mohri et al. | |
| 8,086,554 B1 * | 12/2011 | Steele et al. | 706/48 |
| 2008/0059464 A1 * | 3/2008 | Law et al. | 707/6 |
| 2008/0109431 A1 * | 5/2008 | Kori | 707/6 |
| 2011/0145404 A1 * | 6/2011 | Gingell et al. | 709/224 |

FOREIGN PATENT DOCUMENTS

| | | |
|---|---|---|
| JP | 2009-058989 | 3/2009 |
| JP | 2010-225156 | 10/2010 |

OTHER PUBLICATIONS

Office Action dated Jan. 28, 2014 in counterpart JP Application No. 2011-203183 and English-language translation thereof.

(Continued)

*Primary Examiner* — David Vincent
(74) *Attorney, Agent, or Firm* — Nixon & Vanderhye, P.C.

(57) ABSTRACT

In an embodiment, an automaton determinization method includes: state-generating, first-transition-generating, second-transition-generating, and first-deleting. The state-generating includes generating, assigned with a first symbol, a second state newly. The first-transition-generating includes generating a second transition that leaves from the first state and enters to the second state and that is assigned with the first symbol. The second-transition-generating includes generating, regarding the first transitions, a fourth transition where a state previous to a third transition is substituted with the second state. The third transition is an outgoing transition from a next state of the first transition. The first-deleting includes deleting states that are next to the first transitions where the fourth transitions are generated and that do not have incoming transitions other than the first transitions, deleting outgoing transitions from the deleted states, and deleting the first transitions where the fourth transitions are generated.

15 Claims, 9 Drawing Sheets

(56) References Cited

OTHER PUBLICATIONS

Hopcroft et al., "Equivalence of Deterministic and Nondeterministic Finite Automata", *Introduction to Automata Theory, Languages, and Computation, second edition*, Section 2.3.4, 2001, pp. 60-64.

Glabbeek et al., "Five Determinisation Algorithms", *Implementation and Application of Automata: Proceedings of the 13th International Conference*, CIAA 2008, LNCS 5148, ISBN 978-3-540-70843-8, pp. 161-70.

Mohri, "Finite-State Tranducers in Language and Speech Processing", *Computational Linguistics*, vol. 23, 1997, pp. 269-311.

\* cited by examiner

FIG.4 determinize(A)
1    $M \leftarrow \phi$
2    mergeInitials()
3    $S \leftarrow I$, $Q' \leftarrow I$
4    while $S \neq \phi$
5      $q \leftarrow \text{pop}(S)$
6      $E_{out} \leftarrow \{e \in E \mid p(e) = q\}$
7      $\Sigma_{out} \leftarrow \{\sigma \in \Sigma \mid \sigma = \text{in}(e), e \in E_{out}\}$
8      foreach $\sigma \in \Sigma_{out}$
9        $E_\sigma \leftarrow \{e \in E_{out} \mid \text{in}(e) = \sigma\}$
10        if $|n(E_\sigma)| = 1$
11          $q_n \leftarrow \text{mergeWeight}(E_\sigma)$
12          if $q_n \notin Q'$
13            $\text{push}(S, q_n)$, $Q' \leftarrow Q' \cup \{q_n\}$
14        else
15          $q_{new} \leftarrow \text{mergeTransitions}(q, \sigma, E_\sigma)$
16          if $\text{reconnect}(q_{new}) = \text{false}$
17            $\text{push}(S, q_{new})$
18          foreach $q_n \in Q$ such that $q_n \in n(E_\sigma)$
19            if $\{e \in E \mid n(e) = q_n\} \subseteq E_\sigma$
20              $E_r \leftarrow \{e \in E \mid p(e) = q_n\}$
21              $E_s \leftarrow \{e_s \mid (e_s, e_d, w) \in M, e_d \in E_r\}$
22              $M \leftarrow M \setminus \{(e_s, e_d, w) \in M \mid e_s \in E_s\}$
23              $E \leftarrow E \setminus E_r$, $Q \leftarrow Q \setminus \{q_n\}$
24        $E \leftarrow E \setminus E_\sigma$
25    remove unreachable states and arcs

FIG.5

```
mergeInitials()
1   if |I|=1
2       return
3   make new state $q_{new} \notin Q$
4   $\lambda(q_{new}) \leftarrow \bigoplus_{q \in I} \lambda(q)$
5   foreach $q \in I$
6       foreach $e \in E$ such that $p(e)=q$
7           $e_{new} \leftarrow (q_{new}, \text{in}(e), \lambda(q_{new})^{-1} \otimes \lambda(q) \otimes w(e), n(e))$
8           $E \leftarrow E \cup \{e_{new}\}$
9           if $I \subseteq n(E)$
10              $M \leftarrow M \cup \{(e_{new}, e, w(e_{new}))\}$
11  if $F \cap I \neq \phi$
12      $F \leftarrow F \cup \{q_{new}\}$, $\rho(q_{new}) \leftarrow \bigoplus_{q \in (F \cap I)} (\lambda(q_{new})^{-1} \otimes \lambda(q) \otimes \rho(q))$
13  $I \leftarrow \{q_{new}\}, Q \leftarrow Q \cup \{q_{new}\} \setminus (I \setminus n(E)), E \leftarrow E \setminus \{e \mid e \in E, p(e) \in (I \setminus n(E))\}$
```

FIG.6

```
mergeTransitions($q, \sigma, E_\sigma$)
1   make new state $q_{new} \notin Q$
2   $w_p \leftarrow \bigoplus_{(q_s, a, w, q_n) \in E_\sigma} w$
3   if $F \cap n(E_\sigma) \neq \phi$
4       $F \leftarrow F \cup \{q_{new}\}$, $\rho(q_{new}) \leftarrow \bigoplus_{(q_s, a, w, q_n) \in E_\sigma \wedge q_n \in F} (w_p^{-1} \otimes w \otimes \rho(q_n))$
5   $e_{det} \leftarrow (q, \sigma, w_p, q_{new})$
6   $E \leftarrow E \cup \{e_{det}\}, Q \leftarrow Q \cup \{q_{new}\}$
7   $M_s \leftarrow \{(e_s, e_d, w) \in M \mid e_s \in E_\sigma\}, M_d \leftarrow \{(e_s, e_d, w) \in M \mid e_d \in E_\sigma\}$
8   $M \leftarrow M \cup \{(e_{det}, e_d, w) \mid (e_s, e_d, w) \in M_s\} \setminus M_s \cup \{(e_s, e_{det}, w) \mid (e_s, e_d, w) \in M_d\} \setminus M_d$
9   foreach $q_n \in Q$ such that $q_n \in n(E_\sigma)$
10      $w_b \leftarrow \bigoplus_{e \in E_\sigma \wedge n(e)=q_n} w(e)$
11      foreach $e_n \in E$ such that $p(e_n)=q_n$
12          $e_{new} \leftarrow (q_{new}, \text{in}(e_n), w_p^{-1} \otimes w_b \otimes w(e_n), n(e_n))$
13          $E \leftarrow E \cup \{e_{new}\}, M \leftarrow M \cup \{(e_{new}, e_n, w(e_{new}))\}$
14  return $q_{new}$
```

FIG.7 mergeWeight($E_\sigma$)
1    let $e \in E_\sigma$
2    if $|E_\sigma| \neq 1$
3       $w_p \leftarrow \bigoplus_{(q_s, a, w, q_n) \in E_\sigma} w$
4       $e_{det} \leftarrow (p(e), \text{in}(e), w_p, n(e))$
5       $M_d \leftarrow \{(e_s, e_d, w) \in M \mid e_d \in E_\sigma\}$
6       $M \leftarrow (M \setminus M_d) \cup \{(e_s, e_{det}, w) \mid (e_s, e_d, w) \in M_d\}$
7       $E \leftarrow (E \setminus E_\sigma) \cup \{e_{det}\}$
8    return $n(e)$

FIG.8 reconnect($q$)
1    $E_{out} \leftarrow \{e \in E \mid p(e) = q\}$
2    if $E_{out} \subseteq \{e_s \mid (e_s, e_d, w) \in M\}$
3       $D \leftarrow \{(e_d, w) \mid (e_s, e_d, w) \in M, e_s \in E_{out}\}$
4       $E_m \leftarrow \{e_s \mid (e_s, e_d, w) \in M, (e_d, w') \in D\} \setminus E_{out}$
5       $Q_m \leftarrow \{q_m \mid (q_m, a, w, q_n) \in E_m\}$
6       foreach $q_m \in Q_m$
7          $E_m' \leftarrow \{e \in E \mid p(e) = q_m\}$
8          if $E_m' \subseteq \{e_s \mid (e_s, e_d, w) \in M\}$
9             $D_m \leftarrow \{(e_d, w) \mid (e_s, e_d, w) \in M, e_s \in E_m'\}$
10         if $(D = D_m) \wedge (\rho(q) = \rho(q_m))$
11            $E_{in} \leftarrow \{e \in E \mid n(e) = q\}$
12            $E \leftarrow (E \setminus (E_{in} \cup E_{out})) \cup \{(p(e), \text{in}(e), w(e), q_m) \mid e \in E_{in}\}, Q \leftarrow Q \setminus \{q\}$
13            return true
14  return false

FIG.19

```
reconnect(q)
1   if {q}⊆{q_s | (q_s, q_d, w) ∈ M}
2       D ← {(q_d, w) | (q_s, q_d, w) ∈ M, q_s = q}
3       Q_m ← {q_s | (q_s, q_d, w) ∈ M, (q_d, w') ∈ D}\{q}
4       foreach q_m ∈ Q_m
5           D_m ← {(q_d, w) | (q_s, q_d, w) ∈ M, q_s = q_m}
6           if D = D_m
7               E_in ← {e ∈ E | n(e) = q}, E_out ← {e ∈ E | p(e) = q}
8               E ← (E\(E_in ∪ E_out)) ∪ {(p(e), in(e), w(e), q_m) | e ∈ E_in}, Q ← Q\{q}
9               return true
10  return false
```

FIG.20

```
reconnect(q)
1   E_out ← {e ∈ E | p(e) = q}
2   if E_out ⊆ {e_s | (e_s, e_d) ∈ M}
3       D ← {e_d | (e_s, e_d) ∈ M, e_s ∈ E_out}
4       E_m ← {e_s | (e_s, e_d) ∈ M, e_d ∈ D}\E_out
5       Q_m ← {q_m | (q_m, a, q_n) ∈ E_m}
6       foreach q_m ∈ Q_m
7           E_m' ← {e ∈ E | p(e) = q_m}
8           if E_m' ⊆ {e_s | (e_s, e_d) ∈ M}
9               D_m ← {e_d | (e_s, e_d) ∈ M, e_s ∈ E_m'}
10              if (D = D_m) ∧ ((q ∈ F) = (q_m ∈ F))
11                  E_in ← {e ∈ E | n(e) = q}
12                  E ← (E\(E_in ∪ E_out)) ∪ {(p(e), in(e), q_m) | e ∈ E_in}, Q ← Q\{q}
13                  return true
14  return false
```

AUTOMATON DETERMINIZATION METHOD, DEVICE, AND COMPUTER PROGRAM PRODUCT THAT INVOLVES A PLURALITY OF STATES AND DELETING STATES THAT ARE NEXT STATES TO FIRST TRANSITIONS

CROSS-REFERENCE TO RELATED APPLICATIONS

This application is based upon and claims the benefit of priority from Japanese Patent Application No. 2011-203183, filed on Sep. 16, 2011; the entire contents of which are incorporated herein by reference.

FIELD

Embodiments described herein relate generally to an automaton determinization method, an automaton determinization device, and a computer program product.

BACKGROUND

A finite state automaton (FSA) is implemented in various fields such as natural language processing and speech recognition. For example, the applications of an FSA include searching for specific character strings in a text or searching for patterns of character strings in a text. Meanwhile, a finite state automaton is sometimes also called finite automaton (FA) or finite state machine (FSM).

There are various types of an FSA. For example, the types of an FSA include a finite state acceptor, a finite state transducer (FST), a weighted finite state acceptor (WFSA), and a weighted finite state transducer (WFST). A finite state acceptor can only output whether or not a symbol sequence that has been input is accepted. A finite state transducer outputs a symbol sequence according to the symbol sequence that was input. A weighted finite state acceptor outputs a weight according to the symbol sequence that was input. A weighted finite state transducer outputs a weight and a symbol sequence in response to the symbol sequence that was input.

Herein, the weight can be in the form of probability or distance. In the following description, a finite state acceptor is simply referred to as an acceptor. Moreover, typically, a finite state acceptor is sometimes referred to as the finite state automaton (FSA). In the following explanation, "finite state automaton" is used as a collective term for an acceptor, an FST, a WFST, and a WFSA.

An FST is used, for example, as a word dictionary in speech recognition. Such a word dictionary is configured as an FST that outputs a word in response to a pronunciation that was input. A WFSA or a WFST is used as a model such as a language model in speech recognition for expressing a dictionary or a model required in speech recognition. Alternatively, a WFSA or a WFST is used in statistical machine translation.

As described above, while using an FSA in various applications, necessary information needs to be converted into the FSA. Usually, such conversion is performed by following a simple conversion sequence. However, it is often the case that the FSA obtained by such conversion does not have a suitable configuration for the subsequent processing. Hence, there arises a need to perform conversion of the FSA as necessary. One of such conversion methods is determinization as described below.

A deterministic finite state automaton (DFSA) points to an FSA in which, when a particular input symbol is input, the next state with respect to that input symbol is uniquely determined in any state. A nondeterministic finite state automaton (NFSA) points to an FSA that is not of a DFSA. That is, an NFSA points to an FSA in which a plurality of next states are with respect to a particular input symbol. Herein, determinization points to the conversion of an NFSA into a DFSA. During determinization of an acceptor, for example, subset construction is used.

In the method implemented in the conventional technology, a DFSA is newly generated while retaining the storage area for the NFSA. Thus, in such a method, in order to perform determinization of an NFSA containing a large amount of states and transitions, it becomes necessary to secure a large storage area.

BRIEF DESCRIPTION OF THE DRAWINGS

FIG. 4 is a diagram illustrating an example of a pseudo code for the determinization operation performed on a WFSA;
FIG. 5 is a diagram illustrating an example of a pseudo code for a function mergeInitials;
FIG. 6 is a diagram illustrating an example of a pseudo code for a function mergeTransitions;
FIG. 7 is a diagram illustrating an example of a pseudo code for a function mergeWeight;
FIG. 8 is a diagram illustrating an example of a pseudo code for a function reconnect according to a first embodiment;
FIG. 19 is a diagram illustrating an example of a pseudo code for the function reconnect according to a second embodiment;
and
FIG. 20 is a diagram illustrating an example of a pseudo code for the function reconnect according to a third embodiment.

DETAILED DESCRIPTION

Figure 1:
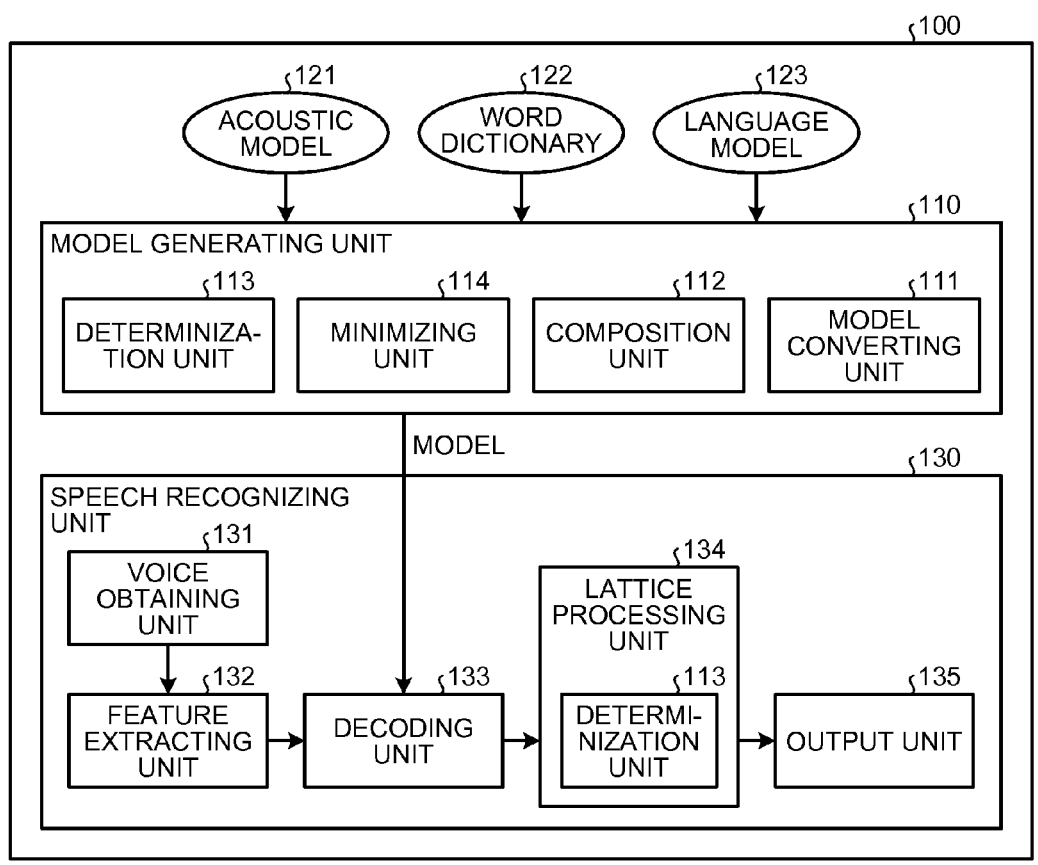
FIG. 1 is a block diagram of a speech recognition apparatus.

Exemplary embodiments of an automaton determinization method, an automaton determinization device, and a computer program product are described below in detail with reference to the accompanying drawings.

In an embodiment, an automaton determinization method includes: state-generating, first-transition-generating, second-transition-generating, and first-deleting. The state-generating includes generating, when there are two or more first transitions that leave from a first state included in a finite state automaton and that are assigned with a first symbol, a second state newly. The first-transition-generating includes generating a second transition that leaves from the first state and enter the second state and that is assigned with the first symbol. The second-transition-generating includes generating, with respect to each of the first transitions, a fourth transition in which a state previous to a third transition is substituted with the second state, the third transition being an outgoing transition from a next state of the first transition. The first-deleting includes deleting states that are next states to the first transitions in which the fourth transitions are generated and that do not have incoming transitions other than the first transitions, deleting outgoing transitions from the deleted states, and deleting the first transitions in which the fourth transitions are generated.

First Embodiment

An automaton determinization device according to a first embodiment performs determinization by means of transforming an NFSA. While performing determinization of an NFSA having a large number of states and transitions present in the same storage area; the states and transitions no longer required for determinization are gradually deleted so as to reduce the necessary amount of storage area for determinization. That makes it possible to perform determinization of an FSA in a smaller storage area. Particularly, the reduction in storage area is effective in determinization of an NFSA having only a small proportion of states for which a plurality of next states are present with respect to a particular input symbol, which is, having a small proportion of nondeterministic states of the total number of states.

Preliminaries

A WFSA is configured as an 8-tuple $(Q, E, \Sigma, K, I, F, \lambda, \rho)$ including a set of states Q, a set of transitions E, a set of input symbols $\Sigma$, a set of weights K, a set of initial states I, a set of final states F, an initial weight function $\lambda$, and a final weight function $\rho$. A transition is configured as a 4-tuple (previous state, input symbol, weight, next state). The set K can be associated with various sets such as a set of all integers, a set of all real numbers, a set of complex numbers, a matrix, a set of Booleans (0 and 1 only), and a set of strings. Moreover, the set K can also be associated with a set of non-positive real numbers or associated with a set of non-negative real numbers. Corresponding to an initial state $q_i \in I$, the initial weight becomes $\lambda(qi)$. Similarly, the final weight, which corresponds to a weight for finite state $qf \in F$, becomes $\rho(qf)$. When a non-final state q is passed as an argument to the final weight function $\rho$, it is assumed that a value not included in the set K is returned and is same with respect to all non-final states. Herein, it is assumed that the abovementioned eight sets are always referable from all methods (pseudo codes) as the information constituting the WFSA that is to be subjected to determinization according to the first embodiment.

In order to perform determinization of a WFSA, it is necessary to define two binary operations (+) and (×) as well as define constant numbers $0^\#$ and $1^\#$ with respect to the set K. Herein, it is assumed that the set K accompanied by such operations and constant numbers satisfies a condition called semiring. Moreover, with respect to arbitrary $a \in K$ and $b \in K$ that satisfy $a(+)b \neq 0^\#$, there needs to exist "c" that satisfies $c=(a(+)b)^{-1}(\times)a$. Meanwhile, the inverse of "x" is written as $x^{-1}$. Thus, $x^{-1}(\times)x$ is equal to $1^\#$. To be a semiring, the set K needs to satisfy the following four conditions (1) to (4).

(1) The set K is a commutative monoid with respect to (+), and the identity element thereof is $0^\#$.
(2) The set K is a monoid with respect to (×), and the identity element thereof is $1^\#$.
(3) With respect to arbitrary $x \in K$, $y \in K$, and $z \in K$; the distributive law holds true. Thus,
$x(\times)(y(+)z)=(x(\times)y)(+)(x(\times)z)$ is satisfied, and
$(y(+)z)(\times)x=(y(\times)x)(+)(z(\times)x)$ is satisfied.
(4) With respect to arbitrary $x \in K$, $0^\# (\times)x=x(\times)0^\#=0^\#$ holds true.

In a semiring that satisfies the above-mentioned conditions, for example, a set called tropical semiring (or a min-plus semiring) is present. The tropical semiring is a set having infinity ($\infty$) included in addition to a real number $R_+$ that is equal to or greater than zero. The tropical semiring is accompanied by operations and constant numbers which ensure that (+) represents min, (×) represents +, $0^\#$ represents $\infty$, and $1^\#$ represents 0. Meanwhile, even when the set K has infinity ($\infty$) included in addition to an integer $N_+$ that is equal to or greater than zero, it is called tropical semiring.

A semiring in which the set K having $-\infty$ included in addition to a real number $R_-$ equal to smaller than zero and in which (+) represents max, (×) represents +, $0^\#$ represents $-\infty$, and $1^\#$ represents 0 also satisfies the above-mentioned conditions. Similarly, a log semiring having the calculation of the tropical semiring (+) replaced with $x(+)y=-\log(e^{-x}+e^{-y})$ also satisfies the abovementioned conditions. Moreover, a string semiring in which the set is a string, (+) represents the longest common prefix, (×) represents the concatenation, $1^\#$ represents a blank string (written as $\epsilon$), and $0^\#$ represents $\tau$ also satisfies the conditions. Herein, it is assumed that, with respect to an arbitrary string x, $\tau$ represents a string that satisfies $x(+)\tau=\tau(+)x=x$ and $\epsilon$ represents a strings that satisfies $x=x(\times)\epsilon=x$. Moreover, the inverse can also be defined and, with respect to arbitrary x and y, the inverse is $x^{-1}(\times)(x(\times)y)=y$. By using a string semiring, an FST can be treated in an identical manner to a WFSA. Meanwhile, various other semirings are also known.

In the case of a WFSA, a weight is added to an FST. However, by using a semiring having a combination of a semiring satisfying the abovementioned conditions and a string semiring, an FST can be treated in an identical manner to a WFST. For example, in the case of using a tropical semiring for the weights and using a string semiring for the output strings, the set K is considered to be a combination of a set of weights $(R_+ \cup \{\infty\})$ and a set of strings $\Sigma^*$. Then, with respect to arbitrary weights $a \in (R_+ \cup \{\infty\})$ and $b \in (R_+ \cup \{\infty\})$ and with respect to strings $x \in \Sigma^*$ and $y \in \Sigma^*$, if (+) is defined as $(a, x) (+) (b, y)=(a(+)b, x(+)y)$, if (×) is defined as $(a, x) (\times) (b, y)=(a(\times)b, x(\times)y)$, if $0^\#$ is defined as $(\infty, \tau)$, and if $1^\#$ is defined as $(0, \epsilon)$; a WFST can be treated in an identical manner to a WFSA.

Regarding a transition e; the previous state is expressed as p(e), the next state is expressed as n(e), the input symbol is expressed as in(e), and the weight is expressed as w(e). A set of next states of the transitions included in the set of transitions E is expressed as n(E).

An empty set is expressed either as $\phi$ or as { }. The number of elements of a set B is expressed as |B|. A difference set is expressed using "\". For example, $\{1, 2\}\setminus\{2\}$ is equal to $\{1\}$. Equation (1) given below indicates that each element of a set W is subjected to the operation (+).

$$(+)w \; w \in W \qquad (1)$$

When the elements are expressed as $w_1, w_2, w_3, \ldots, w_{|w|}$; Equation (1) has the same meaning as $w_1(+)w_2(+)w_3(+)\ldots(+)w_{|w|}$.

A best weight points to the result obtained by performing the operation (+) on the elements of the target weight. If a different semiring is used for the same target weight, then the best weight may vary. For example, with respect to a set of weights {1, 2, 3}; when a semiring having (+) as min is used, then the best weight is 1. In contrast, if a semiring having (+) as max is used, then the best weight is 3.

General Description of Method

Given below is the explanation regarding an example of implementing the automaton determinization device in a speech recognition apparatus. Alternatively, the automaton determinization device can also be implemented by other types of apparatuses. Moreover, although the following explanation is given for a determinization method with respect to a WFSA, the same sequence can be followed for determinization of other types of an FSA. FIG. 1 is a block diagram of a configuration example of a speech recognition apparatus 100. As illustrated in FIG. 1, the speech recognition apparatus 100 includes a model generating unit 110, a speech recognizing unit 130, an acoustic model 121, a word dictionary 122, and a language model 123.

The speech recognizing unit 130 recognizes the speech that is input and outputs a speech recognition result. The speech recognizing unit 130 includes a voice obtaining unit 131, a feature extracting unit 132, a decoding unit 133, a lattice processing unit 134, and an output unit 135. The voice obtaining unit 131 incorporates the voice recorded in various memory devices (not illustrated), incorporates the voice input from a microphone, and incorporates the voice input from a communication line; and transfers such voices to the feature extracting unit 132. Then, the feature extracting unit 132 extracts the feature quantity of each received voice and sends the feature quantity to the decoding unit 133. Then, the decoding unit 133 makes use of a model generated by the model generating unit 110 to decode the received feature quantity and sends the decoding result as a lattice (a word lattice or a phoneme lattice) to the lattice processing unit 134.

The lattice processing unit 134 includes a determinization unit 113. Since a lattice is a type of FSA, the lattice processing unit 134 makes use of the determinization unit 113 to perform determinization as per the requirement. For example, the lattice processing unit 134 finds the most probable series in the lattice as the recognition result and sends that series as the recognition result to the output unit 135. Then, the output unit 135 outputs (presents) the recognition result to the user using a screen or the like.

The acoustic model 121 records therein the information required to find the phonemes corresponding to a feature quantity extracted by the feature extracting unit 132. The word dictionary 122 records therein the phoneme strings in a corresponding manner with words. The language model 123 records therein the information required to find the probable sequence of string of words. Meanwhile, the configuration can be such that the language model 123 is replaced with a grammar that represents the sequence of recognizable words.

The model generating unit 110 generates a model that is expressed in a WFST and that is to be used in the decoding unit 133. The model generating unit 110 considers the acoustic model 121, the word dictionary 122, and the language model 123 as the input, and generates a model by converting the input models into WFSTs. In the WFST converted from a word dictionary; the input symbols have phonemes assigned thereto, the output symbols have words assigned thereto, and the weights have, for example, "0" assigned thereto. In the WFST converted from the language model; the input symbols and the output symbols have words assigned thereto and the weights are assigned with values used in finding the sequence of string words.

The model generating unit 110 includes a model converting unit 111, a composition unit 112, the determinization unit 113, and a minimizing unit 114.

The model converting unit 111 converts the input models (the acoustic model 121, the word dictionary 122, and the language model 123) into WFSTs. The composition unit 112 composes a plurality of models that are obtained by conversion. For example, when the WFST generated from the word dictionary 122 is composed with the WFST generated from the language model 123, a WFST gets generated in which the input symbols correspond to phonemes, the output symbols correspond to words, and the weights correspond to the values used in finding the sequence of string words. The determinization unit 113 performs determinization of the pre-composition WFSTs and the post-composition WFSTs as per the requirement. The minimizing unit 114 transforms the determinized WFSTs in such a way that the WFSTs have the smallest possible number of states and transitions.

In this way, in the first embodiment, the determinization operation is performed during at least one of the following two situations: while generating a model in speech recognition (determinization of the model generating unit 110 performed by the determinization unit 113) and while processing the lattices generated during decoding (determinization of the lattice processing unit 134 performed by the determinization unit 113). As described already, as far as determinization is concerned, a WFST can be treated in an identical manner to the WFSA. Hence, the following explanation is given with reference to a WFSA.

Figure 2:
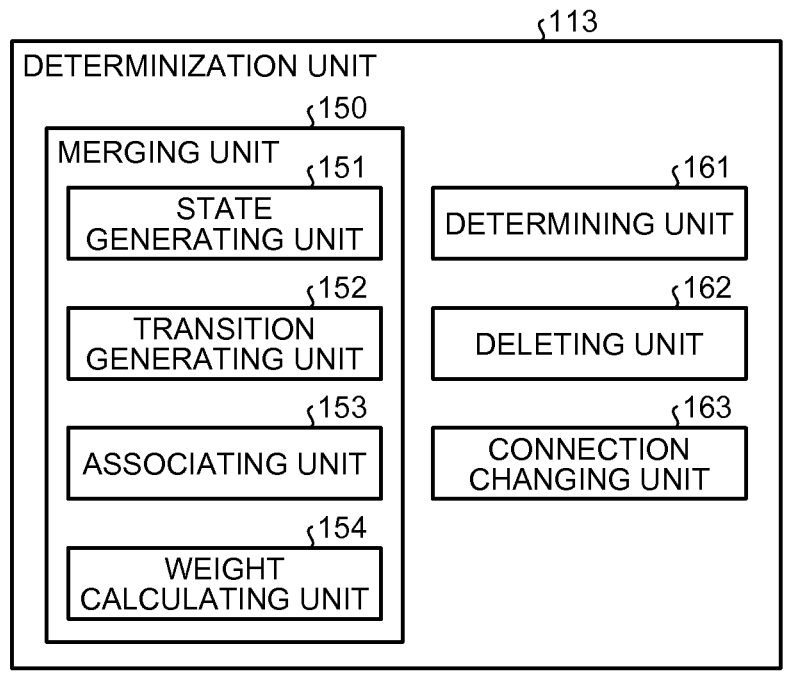
FIG. 2 is a block diagram of a determinization unit.

FIG. 2 is a block diagram of a detailed configuration example of the determinization unit 113. Herein, the determinization unit 113 includes a merging unit 150, a determining unit 161, a deleting unit 162, and a connection changing unit 163. The merging unit 150 merges transitions and generates states as necessary for the purpose of determinization. The merging unit 150 includes a state generating unit 151, a transition generating unit 152, an associating unit 153, and a weight calculating unit 154.

The state generating unit 151 generates states that are necessary while performing determinization. For example, regarding each state (first state) included in a WFSA to be determinized, if there are two or more transitions (first transitions) that leave from the first state and that are assigned with the same symbol, then the state generating unit 151 generates a new state (second state).

The transition generating unit 152 generates transitions that are necessary while performing determinization. For example, the transition generating unit 152 generates transitions (second transitions) from the first states to the second states. Moreover, the transition generating unit 152 generates transitions (fourth transitions) for which the states previous to the outgoing transitions (third transitions) from the next states of the first transitions are replaced with the second states.

The associating unit 153 associates the transitions generated by the transition generating unit 152 with the transitions that are already included in the WFSA and that serve as the basis for transition generation. For example, the associating unit 153 associates the third transitions with the fourth transitions.

The weight calculating unit 154 calculates the weights of the transitions that are generated. For example, as the weight of the second transitions, the weight calculating unit 154 calculates the best weight from the weights of a plurality of the first transitions according to a predetermined operation.

The determining unit 161 determines whether or not there are equivalent states included in a WFSA to be determinized. For example, when two states satisfy a predetermined criterion regarding the transitions associated with the outgoing transitions from those states, the determining unit 161 determines that the two states are equivalent. For example, the determining unit 161 uses a criterion in which all transitions associated with the outgoing transitions from a particular state match with all transitions associated with the outgoing transitions from another state.

The deleting unit 162 deletes, from the storage area, the states and transitions which are no longer required due to the operation performed by the merging unit 150. Moreover, when the determining unit 161 determines that a particular state is equivalent to another state, the deleting unit 162 deletes one of those two states. In the case of determinization of an FSA having no cyclic path, determinization can be carried out even in the absence of the determining unit 161. However, in that case, the number of states and transitions in the determinized FSA increases as compared to the case when the determining unit 161 is disposed.

The connection changing unit 163 changes the destination state of a transition as necessary. That is, the connection changing unit 163 performs connection changing for transitions. For example, if the two states determined to be equivalent, the state subsequent to the incoming transitions to one of those states is changed to the other of the two states by the connection changing unit 163.

Figure 3:
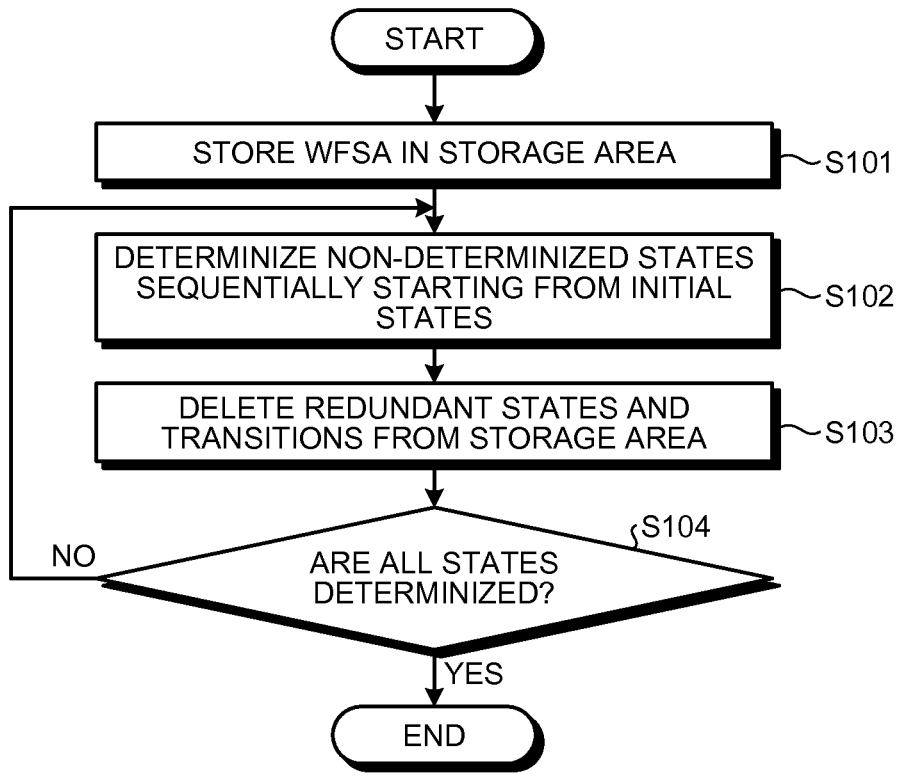
FIG. 3 is a flowchart for explaining an overall sequence followed in a determinization operation.

Explained below with reference to FIG. 3 is a determinization operation performed by the speech recognition apparatus 100 configured in the abovementioned manner according to the first embodiment. FIG. 3 is a flowchart for explaining an overall sequence followed in the determinization operation according to the first embodiment. The flowchart illustrated in FIG. 3 is not confined to the first embodiment, but represents the outline of the sequence followed in the determinization operation according all embodiments described below.

At the start of the operations, the determinization unit 113 loads an NFSA (in the first embodiment, a nondeterministic WFSA) to be determinized into the storage area of a memory device such as a random access memory (RAM) (Step S101). Meanwhile, until determinization is completed for all states, the determinization unit 113 keeps on repeating the operations at Step S102 and Step S103 described below. The merging unit 150 of the determinization unit 113 sequentially determinizes non-determinized states starting from the initial states (Step S102). Then, the deleting unit 162 of the determinization unit 113 deletes the states and transitions which are no longer required due to the determinization performed at Step S102 (Step S103).

The determinization unit 113 determines whether or not all states are determinized (Step S104). If all states are not yet determinized (No at Step S104), then the system control returns to Step S102. Once all states are determinized (Yes at Step S104), the determinization operation is ended.

Explained below is a detailed example of the determinization operation. FIG. 4 is a diagram illustrating an example of a pseudo code for the determinization operation performed on a WFSA according to the first embodiment. Herein, it is assumed that a nondeterministic WFSA A=(Q, E, Σ, K, I, F, λ, ρ) that is to be determinized is stored in advance in the storage area. In the present embodiment, determinization is performed by sequentially changing Q, E, I, F, λ, and ρ that are stored in the storage area.

At the first line, a 3-tuple set M (described later) is initialized to an empty set. Herein, M is assumed to be referable from any pseudo code.

At the second line, a function mergeInitials is implemented to merge the initial states into a single state. The details of the function mergeInitials are given later.

At the third line, the set I is substituted into a set S. Moreover, the set I is substituted into a set Q' that is used in determining whether or not the operation has been performed. Herein, the set S can be a stack or a queue or the like.

At the fourth line, it is determined whether or not the set S is an empty set. If the set S is not an empty set, the operations from the fifth line to the 24-th line are performed.

At the fifth line, a single state is extracted from the set S and is substituted into the state q.

At the sixth line, the outgoing transitions from the state q are substituted into a set $E_{out}$.

At the seventh line, the input symbols of the transitions included in the set $E_{out}$ are substituted into a set $\Sigma_{out}$.

At the eighth line, it is indicated that the operations from the ninth line to the 24-th line are performed with respect to each input symbol σ included in the set $\Sigma_{out}$.

At the ninth line, those transitions in the set $E_{out}$ which have the input symbol as σ are substituted into a set $E_\sigma$.

At the 10-th line, it is determined whether or not the number of next states of the transitions included in the set $E_\sigma$ is one. If the number of next states is one, the operations from the 11-th row to the 13-th row are performed. On the other hand, if the number of next states is not one, the operations from the 15-th row to the 24-th row are performed.

At the 11-th line, a function mergeWeight is called. To that function is passed $E_\sigma$ as the argument and the state obtained as the return value is substituted into a state $q_n$. When the set $E_\sigma$ includes a plurality of transitions, the function mergeWeight performs the function of merging the transitions into a single transition. The details of the function mergeWeight are given later.

At the 12-th line, it is determined whether the state $q_n$ is included in the set Q'. If the state $q_n$ is not included in the set Q', the 13-th line is processed.

At the 13-th line, the state $q_n$ is added to the sets S and Q'.

At the 15-th line, a function mergeTransitions is called. The function mergeTransitions merges transitions, generates a new necessary state, and returns that state as the return value. The newly-generated state is referred to as a state $q_{new}$. For example, the function mergeTransitions corresponds to the functions performed by the state generating unit 151, the transition generating unit 152, and the associating unit 153.

At the 16-th line, a function reconnect is called with $q_{new}$ as the argument. The function reconnect determines whether or not a state equivalent to the state $q_{new}$ is present. If an equivalent state is found, then the function reconnect returns true. On the other hand, if no equivalent state is found, then the function reconnect returns false. Moreover, if an equivalent state is found, the function reconnect performs the operation of changing the next states of the incoming transitions to the state q as the equivalent state (i.e., performs connection changing). In this specification, the term "equivalent states" means that even if one state is same as the other state, the languages accepted by the WFSA and the weights output by the WFSA are not affected. In the case of an acceptor, since the weights are not present, the accepted languages are not affected by equivalent states. The details of the function reconnect are given later. Meanwhile, if the return value is false, the state $q_{new}$ is added to the set S at the 17-th line. Herein, the function reconnect corresponds to, for example, the connection changing unit 163.

The 18-th line indicates that the operations from the 19-th line to the 23-rd line are performed on each state $q_n$ that is included in the set starting from the next state of the transitions included in the set $E_G$.

At the 19-th line, it is determined whether all incoming transitions to the state $q_n$ are included in the set $E_o$. If all incoming transitions to the state $q_n$ are included in the set $E_o$, the operations from the 20-th line to the 23-rd line are performed.

At the 20-th line, the outgoing transitions from the state $q_n$ are substituted into a set $E_r$.

At the 21-st line, transitions are substituted into a set $E_s$. Of 3-tuples (transition of link source, transition of link destination, weight) included in the set M, the transitions substituted into the set $E_s$ are such transitions of link source $e_s$ that have transitions of link destination $e_d$ included in the set $E_r$.

At the 22-nd line, of the 3-tuples included in the set M, the 3-tuples having the transitions of link source $e_s$ included in the set $E_s$ are deleted from the set M. By deleting from the set M those 3-tuples in which the outgoing transitions from the previous states of the transitions $e_s$ serve as the transitions of link source, it becomes possible to further reduce the storage area required for performing determinization.

At the 23-rd line, the transitions included in the set $E_r$ are deleted from the set of transitions E. Moreover, the state $q_n$ is deleted from the set of states Q.

At the 24-th line, the set $E_o$ is deleted from the set of transitions E.

At the 25-th line, the states and the transitions that were not deleted till the 24-th line are deleted. The states to be deleted are the states which are unreachable from the initial states. The transitions to be deleted are the transitions which have the respective previous states or the respective next states to be unreachable from the initial states. In other words, transitions to be deleted are those that cannot be traced and passed through from the initial states. The configuration can be such that the deletion operation at the 25-th line is performed once the repetitive operations from the fifth line to the 24-th line, as instructed at the fourth line, are performed for a certain number of times. Alternatively, the configuration can be such that the deletion operation at the 25-th line is performed once the repetitive operations from the 15-th line to the 24-th line are performed for a certain number of times. Thus, the configuration can be such that the states and the transitions which are unreachable from the initial states can be deleted at an arbitrarily predetermined frequency.

FIG. 5 is a diagram illustrating an example of the detailed pseudo code for the function mergeInitials.

At the first line, it is determined whether or not only a single initial state is present. If only a single initial state is present, no operation is performed and the operations for the function mergeInitials are ended at the second line. That is, the operations from the third line are not performed.

At the third line, for the purpose of generating a new initial state, a new state $q_{new}$ not included in the set Q is generated.

At the fourth line, the operation (+) is performed on initial weights of the initial states included in the set of initial states I and the calculation result is recorded as the initial weight of the state $q_{new}$ in $\lambda(q_{new})$.

The fifth line indicates that the operations from the sixth line to the 10-th line are performed for each initial state.

The sixth line indicates that the operations from the seventh line to the 10-th line are performed for each outgoing transition e from the state q.

At the seventh line, a new transition $e_{new}$ is generated. The new transition $e_{new}$ is generated in such a manner where the previous state is the $q_{new}$; the input symbol is the input symbol of the transition e; the weight of the transition is the result obtained by performing the operation (×) on the inverse of $\lambda(q_{new})$ with respect to (×), $\lambda(q)$, and the weight of the transition e; and the next state is the next state of the transition n(e).

At the eighth line, the transition $e_{new}$ is added to the set E.

The ninth line indicates that the operation at the 10-th line is performed if all initial states included in the set I have incoming transitions. If there is even a single initial state that does not have a single incoming transition, then there is no chance that a state equivalent to the state $q_{new}$ would be found in subsequent operations. Hence, there is no need to add a 3-tuple to the set M for the purpose of determining equivalent states. Thus, the 10-th line need not be processed.

At the 10-th line, a 3-tuple $(e_{new}, e, w(e_{new}))$ is added to the set M.

At the 11-th line, it is determined whether or not a state is present that serves not only as an initial state but also as a final state. If such a state is present, then the operation at the 12-th line is performed.

At the 12-th line, the state $q_{new}$ is added to the set of final states F. Moreover, a final weight $\rho(q_{new})$ is set. The value of the final weight is set to a value obtained by performing, with respect to each initial state q that also doubles up as the final state, the operation (×) on the inverse of the initial weight of $q_{new}$, the initial weight of q, and the final weight of q; and then by performing the operation (+) on all values obtained regarding all of the initial states q.

At the 13-th line, the set I is made to be a set having only the state $q_{new}$, and the state $q_{new}$ is added to the set Q. Moreover, other than the initial states, the states having incoming transitions are deleted from Q. Besides, the transitions outgoing from the deleted states are also deleted.

FIG. 6 is a diagram illustrating an example of the detailed pseudo code for the function mergeTransitions.

At the first line, a new state $q_{new}$ not included in the set Q is generated.

At the second state, in a weight $w_p$ is substituted the result obtained by performing the operation (+) on the weights of transitions included in the set $E_o$. That is, in the weight $w_p$ is substituted the best weight of transitions included in the set $E_o$.

At the third line, when the next states of the transitions included in the set $E_o$ include final states, the operation at the fourth line is performed.

At the fourth line, the state $q_{new}$ is added to the set of final states F. Moreover, in the final weight $\rho(q_{new})$ is substituted a weight obtained by performing the following calculation with respect to the weights w and the next states $q_n$ of such transitions included in the set $E_o$ which have the final states as the respective next states. That weight is the result of performing the operation (×) on the inverse of $w_p$, w, and the final weight $\rho(q_n)$ of the state qn.

At the fifth line, a transition having q as the previous state, a transition having $q_{new}$ as the next state, σ as the input symbol, and $w_p$ as the weight is set as a transition $e_{det}$.

At the sixth line, the transition $e_{det}$ is added to the set E and the state $q_{new}$ is added to the set Q.

At the seventh line, of 3-tuples $(e_s, e_d, w)$ included in the set M, only 3-tuples having the transitions $e_s$ included in set $E_o$ are substituted into a set $M_s$. In an identical manner, of the 3-tuples $(e_s, e_d, w)$ included in the set M, only 3-tuples having the transitions $e_d$ included in the set $E_o$ are substituted into a set $M_d$.

At the eighth line, to the set M is added a set that is obtained by replacing the transition $e_s$ in each 3-tuple $(e_s, e_d, w)$ included in the set $M_s$ with the transition $e_{det}$, and the set $M_s$ is deleted from the set M. Similarly, to the set M is added a set that is obtained by replacing the transition $e_d$ in each 3-tuple ($e_s$, $e_d$, w) included in the set $M_d$ with the transition $e_{det}$, and the set $M_d$ is deleted from the set M.

The ninth line indicates that the operations from the 10-th line to the 13-th line are performed on each state $q_n$ that is included in the set of next states of the transitions included in the set $E_o$.

At the 10-th line, of the transitions included in the set $E_G$, the operation (+) is performed on the weights of all transitions having the state $q_n$ as the next state; and the result is substituted into the weight $w_b$.

The 11-th line indicates that the operations at the 12-th line and the 13-th line are performed on each outgoing transition $e_n$ from the state $q_n$.

At the 12-th line, a new transition $e_{new}$ is generated in such a manner where the state $q_{new}$ is set to be the previous state of the transition $e_{new}$; $n(e_n)$ is set to be the next state of the transition $e_{new}$; the input symbol of the transition $e_n$ is set to be the input symbol of the transition $e_{new}$; and the result obtained by performing the operation (×) on the inverse of $w_p$, $w(e_o)$, and $w(e_n)$ is set to be the weight of the transition $e_{new}$.

At the 13-th line, the transition $e_{new}$ is added to the set E. Moreover, a 3-tuple ($e_{new}$, e, $w(e_{new})$) is added to the set M. Adding a 3-tuple including $e_n$ and $e_{new}$ to the set M corresponds to, for example, the function of the associating unit 153 of associating the transition ($e_{new}$) that is generated with the transition $e_n$ that serves as the basis for transition generation.

At the 14-th line, $q_{new}$ is returned as the return value.

FIG. 7 is a diagram illustrating an example of the detailed pseudo code for the function mergeWeight. Herein, it is assumed that the transitions included in the set $E_o$ have the same previous state, the same next state, and the same input symbol. Moreover, it is assumed that the set $E_o$ includes more than one transition.

The first line indicates that the transition e is included in the set $E_o$.

At the second line, it is determined whether or not the number of transitions included in the set $E_o$ is one. If the number of transitions is one, then the system control proceeds to the eighth line. In any other case, that is, when the number of transitions is two or more, the operations from the third line to the seventh line are performed.

At the third line, the operation (+) is performed on the weights of all transitions included in the set $E_o$; and the result is substituted into the weight $w_p$.

At the fourth line, the transition e having the weight changed to the weight $w_p$ is substituted into the transition $e_{det}$.

At the fifth line, of the 3-tuples (transition of link source, transition of link destination, weight) included in the set M; a set including 3-tuples having the transition of link destination $e_d$ included in the set $E_o$ is substituted into a set $M_d$.

At the sixth line, the 3-tuples included in the set $M_d$ are deleted from the set M, and the transitions of link destination of the 3-tuples included in the set $M_d$ are changed to the transition $e_{det}$. Then, the 3-tuples included in the set $M_d$ are added to the set M.

At the seventh line, the transitions included in the set $E_o$ are deleted from the set of transitions E. Then, the transition $e_{det}$ is added to the set of transitions E.

The eighth line indicates that the next state of the transition e is returned as the return value of the function mergeWeight.

FIG. 8 is a diagram illustrating an example of the detailed pseudo code for the function reconnect.

At the first line, the outgoing transitions from the state q are substituted into the set $E_{out}$.

At the second line, it is determined whether or not all transitions included in the set of transitions $E_{out}$ are included in the set of transitions that is composed of the transitions $e_s$ of the 3-tuples ($e_s$, $e_d$, w) included in the set M. If all transitions are included in the set $E_{out}$, operations from the third line to the fourteenth line are performed. Otherwise, there is no state equivalent to the state q. Hence, the system control processes to the 14-th line.

At the third line, of the 3-tuples ($e_s$, $e_d$, w) included in the set M, 2-tuples ($e_d$, w) are generated related to the 3-tuples having the transition $e_s$ included in the set $E_{out}$. Then, the set of 2-tuples is substituted into the set D.

At the fourth line, regarding those 3-tuples included in the set M which have the second value matching with the first value $e_d$ of the 2-tuples included in the set D, the set $E_{out}$ is removed from the set composed of the transition $e_s$, which is the first value of those particular 3-tuples. Then, the resultant set is substituted into a set $E_m$.

At the fifth line, in a set $Q_m$ is substituted the set composed of the previous states of the transitions included in the set $E_m$.

The sixth line indicates that the operations from the seventh line to the 13-th line are performed for each state $q_m$ in the set $Q_m$.

At the seventh line, the outgoing transitions from the states $q_m$ are substituted into a set $E_m'$.

At the eighth line, it is determined whether or not all transitions included in the set $E_m'$ are also included in the set of transitions composed of the transitions $e_s$ of the 3-tuples ($e_s$, $e_d$, w) that are included in the set M. If all transitions included in the set $E_m'$ are also included in the set of transitions composed of the transitions $e_s$, then the operations from the ninth line to the 13-th line are performed.

At the ninth line, of the 3-tuples included in the set M, the 3-tuples having the first value $e_s$ included in the set $E_m'$ have the second value $e_d$ and the third value w are to be substituted into a set $D_m$ composed of 2-tuples including the transition $e_d$ as the first value and the weight w as the second value.

At the 10-th line, it is determined whether the sets D and $D_m$ are identical as well as it is determined whether the final weights corresponding to the states q and $q_m$ are identical. If the sets D and $D_m$ are identical as well as if the final weights corresponding to the states q and $q_m$ are identical, then the state q is equivalent to the state $q_m$. In that case, the operations from the 11-th line to the 13-th line are performed. When neither the state q nor the state $q_m$ is a final state, same values are obtained according to the definition of the final weight function ρ described earlier. Thus, ρ(q)=ρ($q_m$) holds true. When one of the state q and the state $q_m$ is a final state, the value obtained in the final weight function ρ with respect to the final state is included in the set of weights K, but the value obtained in the final weight function ρ with respect to the non-final state is not included in the set of weights K. Thus, ρ(q)≠ρ($q_m$) always holds true. When both the state q and the state $q_m$ are final states, whether or not ρ(q) and ρ($q_m$) are identical is determined according to the values of the final weights.

At the 11-th line, the incoming transitions to the states q are substituted into a set $E_{in}$.

At the 12-th line, the transitions included in the set $E_{in}$ and in the set $E_{out}$ are removed from the set E. Moreover, the transitions changing the next states of the transitions included in the set $E_{in}$ to the state $q_m$ are added to the set E. Furthermore, the state q is removed from the set of states Q. Besides, although not written in the pseudo code, the 3-tuples included in the set M which have the first element included in the set $E_{out}$ can also be removed from the set M. That is, {($e_s$, $e_d$, w)∈M|$e_s$∈$E_{out}$} can also be removed from the set M.

At the 13-th line, "true" is returned as the return value and the operations for the function reconnect are ended.

If no equivalent state to the state q is found even after performing the operations from the seventh line to the 13-th line with respect to all states included in the set $Q_m$, then "false" is returned as the return value at the 14-th line.

As described above, by gradually deleting the states and transitions which become redundant while performing determinization, it becomes possible to carry out the determinization operation with a smaller storage area as compared to the conventional case.

Figure 9:
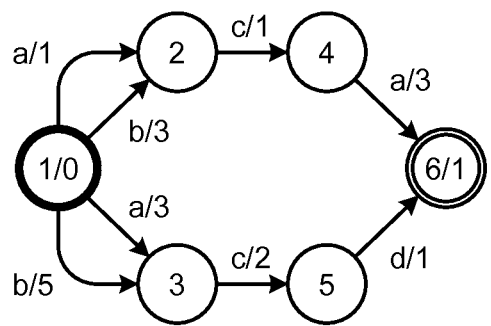
FIG. 9 is a diagram illustrating an example of a nondeterministic WFSA that is to be determinized.

Explained below is a specific example of the determinization operation described above. FIG. 9 is a diagram illustrating an example of a nondeterministic WFSA that is to be determinized.

In the example illustrated in FIG. 9, it is assumed that the semiring of weights is a tropical semiring. In FIG. 9, the circles represent states; the heavy lined circle represents the initial state; the double circle represents the final state; the arrows represent transitions; and, of the characters specified near the arrows, the characters on the left side of "/" represent the input symbols and the characters on the right side of "/" represent the weights. Moreover, the numbers specified inside the circles represent the state numbers.

The operations start from the first line illustrated in FIG. 4. At the first line, the 3-tuple set M to be used later is initialized to an empty set. At the second line, the initial states are merged into a single state. However, since only a single initial state is present in the example illustrated in FIG. 9, no operation is performed. Upon processing the third line, the set S becomes equal to $\{1\}$ and the set Q' becomes equal to $\{1\}$. Since the set S is not an empty set, the system control proceeds to the fifth line. Upon removing a single element from the set S, q=1 and S={ } hold true.

Upon completing the operations at the sixth and seventh lines, the set $E_{out}$ becomes equal to $\{(1, a, 1, 2), (1, b, 3, 2), (1, a, 3, 3), (1, b, 5, 3)\}$ and the set $\Sigma_{out}$ becomes equal to $\{a, b\}$. Regarding the operations from the ninth line to the 24-th line, the operations are firstly performed for the case of σ=a (alternatively, the operations can be firstly performed for σ=b). Upon processing the ninth line, the state $E_\sigma$ becomes equal to $\{(1, a, 1, 2), (1, a, 3, 3)\}$. Since $\{2, 3\}$ represents the set of next states of the transitions included in the set $E_\sigma$, $|n(E_\sigma)|=2$ holds true thereby not satisfying the condition at the 10-th line. Consequently, the system control proceeds to the 15-th line.

The system control proceeds to the function mergeTransitions. The values of arguments are q=1, σ=a, and $E_\sigma=\{(1, a, 1, 2), (1, a, 3, 3)\}$.

At the first line illustrated in FIG. 6, a new state is generated and is set to $q_{new}=7$. The calculation at the second line is performed as follows. In this example, since the tropical semiring is used, the operation (+) becomes the calculation of the minimum value (min). Thus, $w_p=1(+)3=\min(1, 3)=1$ holds true. Since the product set between the set $n(E_\sigma)=\{2, 3\}$ of the next state of set $E_\sigma$ and F=$\{6\}$ is an empty set and does not satisfy the condition at the third line, the system control proceeds to the fifth line. At the fifth line, the transition $e_{det}$ becomes equal to (1, a, 1, 7).

Figure 10:
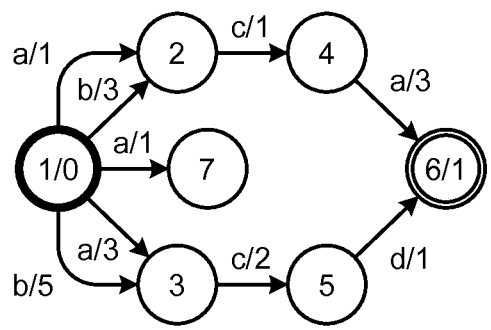
FIG. 10 is a diagram illustrating an example of a WFSA obtained during determinization.

At the sixth line, the transition $e_{det}$ is added to the set E and the state $q_{new}$ is added to the set Q. As a result, a WFSA illustrated in FIG. 10 is obtained.

Since the set M is an empty set (M=φ), the operation at the seventh line leads to $M_s=φ$ and $M_d=φ$. Consequently, even after performing the operation at the eighth line, M=φ holds true.

At the ninth line, firstly, the operations from the 10-th line to the 13-th line are performed for $q_n=2$. Alternatively, there is no problem if the case of $q_n=3$ is processed first.

At the 10-th line, the transition (1, a, 1, 2) is the only transition included in the set $E_\sigma$ having the next state with the state number 2. Hence, the weight 1 of that transition becomes the value of the weight $w_b$.

Then, the operations at the 12-th line and the 13-th line are performed for the transitions having $p(e_n)=2$. Herein, it is sufficient to process only the transition $e_n=(2, c, 1, 4)$.

At the 12-th line, a new transition $e_{new}=(7, c, 1, 4)$ is generated. Since $w_p^{-1}$ is equal to −1, $w_b$ is equal to 1, and $w(e_n)$ is equal to 1; the weight is calculated as −1+1+1=1. At the 13-th line, the transition $e_{new}$ is added to the set E and a 3-tuple $(e_{new}, e_n, 1)$ is added to the set M. Meanwhile, the transitions can also be recorded as 4-tuples or can be recorded as references to the elements included in the set E.

Regarding $q_n=3$ too, the operations from the 10-th line to the 13-th line are performed in an identical manner. At the 10-th line, $w_b=3$ holds true. At the 12-th line and the 13-th line, the operations are performed regarding the transition $e_n=(3, c, 2, 5)$. At the 12-th line, a new transition $e_{new}=(7, c, 4, 5)$ is generated. Since $w_p^{-1}$ is equal to −1, $w_b$ is equal to 3, and $w(e_n)$ is equal to 2; the weight is calculated as −1+3+2=4. At the 13-th line, the transition $e_{new}$ is added to the set E and a 3-tuple $(e_{new}, e_n, 4)$ is added to the set M.

Lastly, at the 14-th line, "$q_{new}$" is returned as the return value and the operations for the function mergeTransitions are ended.

Figure 11:
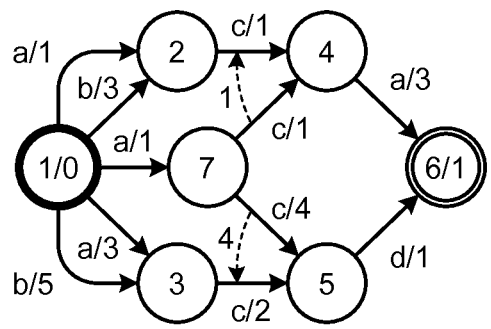
FIG. 11 is a diagram illustrating an example of a WFSA obtained during determinization.

At this point of time, the set M is equal to $\{((7, c, 1, 4), (2, c, 1, 4), 1), ((7, c, 4, 5), (3, c, 2, 5), 4)\}$ and a WFSA illustrated in FIG. 11 is obtained. The dotted arrows correspond to the 3-tuples recorded in the set M. The start of an arrow matches with the first value of a 3-tuple, the tip of an arrow matches with the second value of a 3-tuple, and the value in the vicinity of an arrow matches with the third value of a 3-tuple. That is, it is illustrated that the transition at the start of a dotted arrow is mutually associated with the transition at the tip of that dotted arrow.

Returning to the 15-th line illustrated in FIG. 4, $q_{new}=7$ holds true. At the 16-th line, the system control proceeds to the function reconnect. At the first line illustrated in FIG. 8, $E_{out}=\{(7, c, 1, 4), (7, c, 4, 5)\}$ holds true. At this stage, since all values included in the set $E_{out}$ are included in the first values of the 3-tuples included in the set M, the condition at the second line is satisfied. At the third line, the set D becomes equal to $\{((2, c, 1, 4), 1), ((3, c, 2, 5), 4)\}$.

At the fourth line, the set $E_m$ becomes an empty set ($E_m=φ$). That is because, equal to the set $E_{out}$ is the set of first values of those 3-tuples included in the set M which have the second values equal to the first values of the 2-tuples included in the set D. Thus, a difference set with the set $E_{out}$ results in an empty set. Since $E_m=φ$ holds true, $Q_m=φ$ also holds true at the fifth line. It indicates that there exists no state which is likely to be equivalent to the state with the state number 7. As a result, the operations from the seventh line to the 13-th line are performed. Then, at the 14-th line, "false" is returned as the return value and the operations for the function reconnect are ended. Then, the system control returns to the 16-th line illustrated in FIG. 4.

The result at the 16-th line is false. Hence, when the state with the state number 7 is added to the set S at the 17-th line, S=$\{7\}$ holds true.

Figure 12:
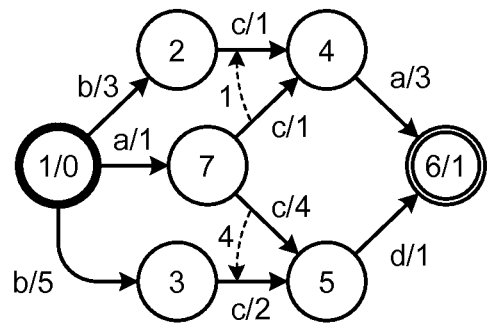
FIG. 12 is a diagram illustrating an example of a WFSA obtained during determinization.

At this stage, the $E_\sigma$ is equal to $\{(1, a, 1, 2), (1, a, 3, 3)\}$. Since $n(E_6)$ is equal to $\{2, 3\}$, the operations from the 19-th line to the 23-rd line are performed on those two states. Firstly, the operations are performed on $q_n=2$. The incoming transitions to the state with the state number 2 are transitions (1, a, 1, 2) and (1, b, 3, 2). Of those transitions, only the transition (1, a, 1, 2) is included in the set $E_o$, and the transition (1, b, 3, 2) is not included. Hence, the condition at the 19-th line is not satisfied. Regarding $q_n$=3 too, the condition at the 19-th line is not satisfied. Consequently, the system control proceeds to the 24-th line at which the set $E_o$ is removed from the set E. As a result, a WFSA illustrated in FIG. 12 is obtained.

Figure 13:
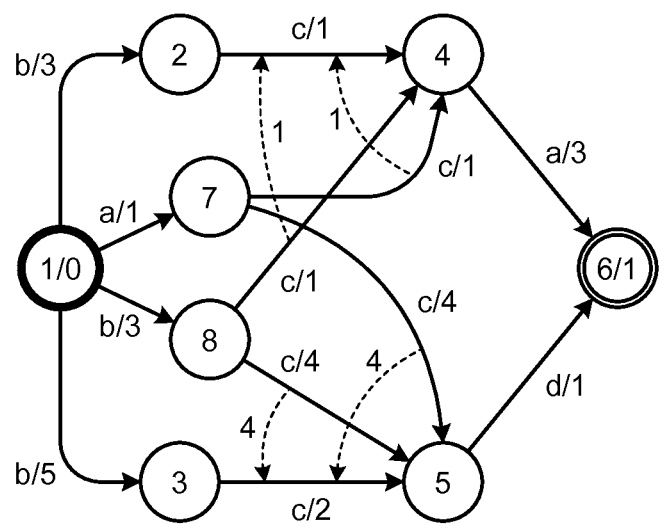
FIG. 13 is a diagram illustrating an example of a WFSA obtained during determinization.

Returning to the eighth line, with σ=b, the operations from the ninth line to the 24-th line are performed in an identical manner to that described above. Since the condition at the 10-th line is not satisfied, the operation at the 15-th line results in a WFSA illustrated in FIG. 13. At this stage, $q_{new}$=8 holds true and M={((7, c, 1, 4), (2, c, 1, 4), 1), ((7, c, 4, 5), (3, c, 2, 5), 4), ((8, c, 1, 4), (2, c, 1, 4), 1), ((8, c, 4, 5), (3, c, 2, 5), 4)} holds true.

At the 16-th line, the function reconnect is processed with the argument $q_{new}$=8. At the first line illustrated in FIG. 8, since $E_{out}$={(8, c, 1, 4), (8, c, 4, 5)} holds true, the condition at the second line is satisfied. At the third line, the set D becomes equal to {((2, c, 1, 4), 1), ((3, c, 2, 5), 4)}. The first elements of the 2-tuples included in the set D are (2, c, 1, 4) and (3, c, 2, 5). In the set M, the 3-tuples having one of those two elements as the second element have the first elements as (7, c, 1, 4), (7, c, 4, 5), (8, c, 1, 4), and (8, c, 4, 5). From that, if the transitions included in the set $E_{out}$ are removed, the set $E_m$ becomes equal to {(7, c, 1, 4), (7, c, 4, 5)}. This is the result obtained at the fourth line. At the fifth line, $Q_m$={7} holds true.

Since the number of elements in the set $Q_m$ is one, it is sufficient to perform the operations from the seventh line to the 13-th line only for $q_m$=7. At the seventh line, the outgoing transitions from the state $q_m$ are substituted into the set $E_m'$. Thus, $E_m'$={(7, c, 1, 4), (7, c, 4, 5)} holds true. Since the condition at the eighth line is satisfied, the system control proceeds to the ninth line. At the ninth line, $D_m$={(2, c, 1, 4), 1), (3, c, 2, 5), 4)} holds true. Since the states D and $D_m$ are identical and since neither the state with the state number 7 nor the state with the state number 8 is a final state, the condition at the 10-th line is satisfied and the system control proceeds to the 11-th line. Satisfaction of the condition at the 10-th line means that the state q=8 and the state $q_m$=7 are equivalent. Since one of those states is redundant, the state with the state number 8 and all outgoing transitions therefrom are deleted at the 11-th and 12-th lines. Regarding each incoming transition to the state with the state number 8, the next state is modified to the state with the state number 7. At the 13-th line, "true" is returned as the return value and the system control returns to the 16-th line illustrated in FIG. 4.

Figure 14:
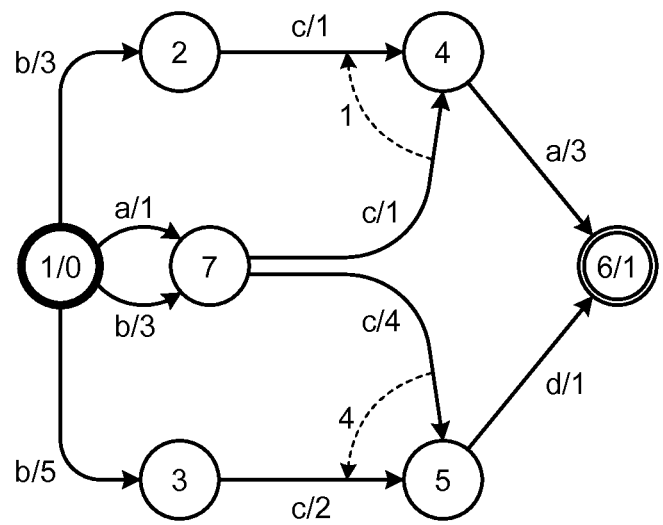
FIG. 14 is a diagram illustrating an example of a WFSA obtained during determinization.

Once the operation at the 16-th line is completed, a WFSA illustrated in FIG. 14 is obtained. Since "true" is returned as the return value, the 17-th line is not processed and S={7} remains that way.

The states with the state numbers 2 and 3 are the states satisfying the condition at the 18-th line. The operations from the 19-th line to the 23-rd are performed line on the states with the state numbers 2 and 3. The only incoming transition to the state with the state number 2 is (1, b, 3, 2) and is included in $E_o$={(1, b, 3, 2), (1, b, 5, 3)}. Thus, the condition at the 19-th line is satisfied, and the operations from the 20-th line are to be performed. In those operations, not only the transitions related to the state with the state number 2 are deleted but also the elements in the set M related to those transitions are deleted. Firstly, at the 20-th line, the outgoing transitions from the state with the state number 2 are substituted into the set $E_r$. Thus, the set $E_r$ becomes equal to {(2, c, 1, 4)}.

At this point of time, M={((7, c, 1, 4), (2, c, 1, 4), 1), ((7, c, 4, 5), (3, c, 2, 5), 4), ((8, c, 1, 4), (2, c, 1, 4), 1), ((8, c, 4, 5), (3, c, 2, 5), 4)} holds true. While processing the 12-th line illustrated in FIG. 8, if those 3-tuples in the set M which have the outgoing transitions from the deleted state with the state number 8 as the first elements are removed from the set M; then M={((7, c, 1, 4), (2, c, 1, 4), 1), ((7, c, 4, 5), (3, c, 2, 5), 4)} holds true. In the former case, at the 21-st line, the set $E_s$ becomes equal to {(7, c, 1, 4), (8, c, 1, 4)}. In the latter case, the set $E_s$ becomes equal to {(7, c, 1, 4)}. FIG. 14 illustrates the latter case.

From the set M are deleted those 3-tuples which have the first elements included in the set $E_s$. In the former case, such 3-tuples are {((7, c, 1, 4), (2, c, 1, 4), 1), ((8, c, 1, 4), (2, c, 1, 4), 1)}. In contrast, in the latter case, such a 3-tuple is only {((7, c, 1, 4), (2, c, 1, 4), 1)}. At the 22-nd line, those 3-tuples are deleted from the set M. At the 23-rd line, the set Er is removed from the set of transitions E and the state with the state number 2 is also removed from the set of states Q.

Figure 15:
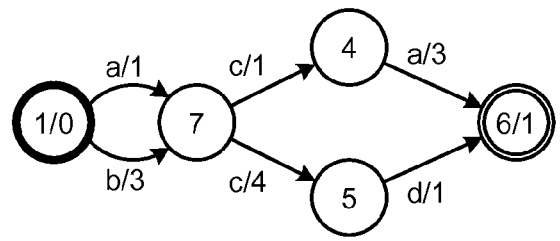
FIG. 15 is a diagram illustrating an example of a WFSA obtained during determinization.

In an identical manner, the operations from the 19-th line to the 23-rd line are performed on the state with the state number 3. In that case, whichever operation is performed at the 12-th line illustrated in FIG. 8, M remains to be an empty set (M={ }). At the 24-th line, the set $E_r$ is deleted from the set of transitions E. As a result, a WFSA illustrated in FIG. 15 is obtained.

Figure 16:
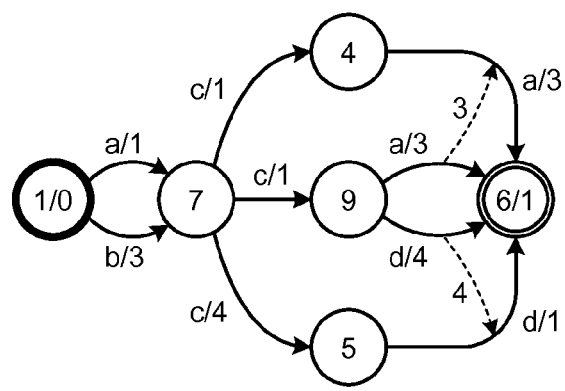
FIG. 16 is a diagram illustrating an example of a WFSA obtained during determinization.

Subsequently, since S={7} holds true, the operations from the fifth line to the 24-th line are performed with q=7. When the operations up to the 17-th line are performed, a WFSA illustrated in FIG. 16 is obtained. Herein, S={9} holds true and M={((9, a, 3), (4, a, 3), 3), ((9, d, 4), (5, d, 1), 4)} holds true. Herein, for the sake of simplicity, each newly-generated state is assigned with a number incremented by one. However, it is also possible to reuse the numbers of deleted states so that the storage area is reduced.

Figure 17:
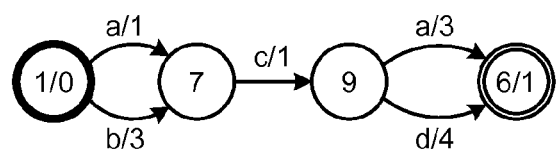
FIG. 17 is a diagram illustrating an example of a WFSA obtained during determinization.

By performing the operations from the 19-th line to the 23-rd line on the states with the state numbers 4 and 5, the condition at the 19-th line is satisfied for both the states. Hence, the outgoing transitions from the state with the state number 4 as well as from the state with the state number 5 are deleted, and the elements of the set M are removed according to the 22-nd line. Moreover, when the transitions included in the set $E_o$ are deleted at the 24-th line, a WFSA illustrated in FIG. 17 is obtained.

Subsequently, since S={9} holds true, the state with the state number 9 is taken out from the set S; and the operations from the sixth line to the 24-th line are performed with q=9. Although $\Sigma_{out}$={a, d} holds true, there exists only a single transition regarding each input symbol. Hence, in either case, the condition at the 10-th line is satisfied and the operations from the 11-th line are performed. At the 11-th line, $q_n$=6 holds true in either case. While processing one of the two cases, the system control proceeds to the 13-th line and the state with the state number 6 is added to the set S. Thus, S={6} holds true. Then, the system control returns to the fourth line. However, since the set S is not an empty set, the system control proceeds to the fifth line and the operations from the sixth line are performed with q=6. Since there is no outgoing transition from the state with the state number 6, the operations from the eighth line are not performed. The system control again returns to the fourth line. Since S={ } holds true, the operation at the 25-th line is performed at the end. However, since all states and transitions are reachable from the initial state, no operation is performed. That marks the end of the determinization operation.

During the determinization operation performed in the abovementioned manner, the maximum number of states that are generated is eight and the maximum number of transitions that are generated is 12. If determinization is performed according to the conventional method, the maximum number of states that are generated is 10. That maximum number is obtained by adding the pre-determinization number of states and the post-determinization number of states. In an identical manner, according to the conventional method, the maximum number of transitions that are generated is 13. Thus, by implementing the method according to the first embodiment, the states and transitions that are generated during the determinization operation decrease in number as compared to the conventional method. That enables achieving reduction in the used storage area as compared to the conventional method.

Although the first embodiment is explained with reference to a WFSA, determinization of an acceptor can also be performed in an identical manner by eliminating the operations regarding the weights. Moreover, determinization of an FST can also be performed by considering the weights as an output symbol sequence, considering the operation (+) as the longest common prefix, and considering (×) as the concatenation operation. Furthermore, as described earlier, if a 2-tuple (weight, output symbol sequence) is considered as a weight, then determinization of a WFST can also be performed in an identical manner.

During determinization of an FST, for example, the weight calculating unit 154 calculates, as the output symbol sequence of second transitions, the symbol sequence of the longest common prefix of the output symbol sequences of a plurality of first transitions. Moreover, the weight calculating unit 154 concatenates, as the prefix of the output symbol sequences of fourth transitions, the symbol sequence of the longest common prefix of the output symbol sequences of a plurality of first transitions and the symbol sequences removed from the prefix of the output symbol sequence of the first transitions.

Figure 18:
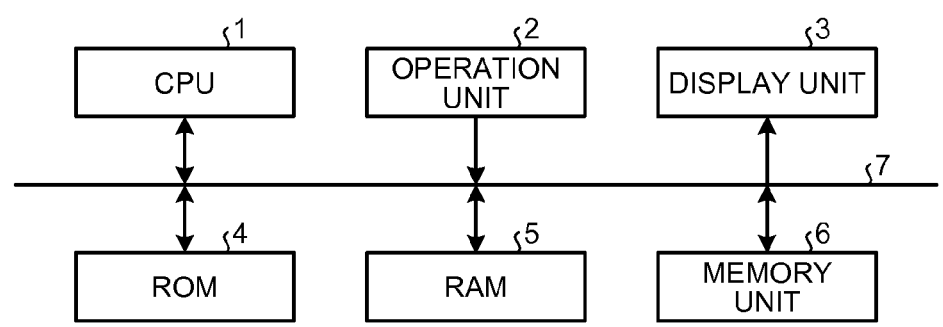
FIG. 18 is a block diagram of an exemplary hardware configuration of the speech recognition apparatus.

FIG. 18 is a block diagram of an exemplary hardware configuration of the speech recognition apparatus 100 according to the first embodiment. As illustrated in FIG. 18, the speech recognition apparatus 100 includes a central processing unit (CPU) 1, an operation unit 2, a display unit 3, a read only memory (ROM) 4, a random access memory (RAM) 5, a memory unit 6, and a bus 7. Herein, all constituent elements are interconnected by the bus 7. In this configuration of the speech recognition apparatus 100, the storage area is not confined to the ROM 4, the RAM 5, or the memory unit 6; but points to any storage area inside the speech recognition apparatus 100 which is used to store an FSA.

The CPU 1 uses a predetermined area in the RAM 5 as the work area; performs various operations in cooperation with various control programs stored in advance in the ROM 4 or the memory unit 6; and comprehensively controls the operations of the constituent elements of the speech recognition apparatus 100. Moreover, in cooperation with predetermined computer programs stored in advance in the ROM 4 or the memory unit 6, the CPU 1 implements the functions of various function units described later.

The operation unit 2 represents an input device such as a mouse, a keyboard, or a microphone. The operation unit 2 receives information, which is input via input operations performed by the user, as instruction signals and outputs those instruction signals to the CPU 1.

The display unit 3 is configured with a display device such as a liquid crystal display (LCD), and displays a variety of information based on display signals received from the CPU 1.

The ROM 4 stores therein, in a non-rewritable manner, various programs or a variety of information related to the control of the speech recognition apparatus 100.

The RAM 5 is a volatile memory medium such as a synchronous dynamic random access memory (SDRAM) and functions as the work area of the CPU 1. More particularly, the RAM 5 serves as a buffer in which values of various variables or parameters, which are generated during the determinization operation, are stored on a temporary basis.

The memory unit 6 includes a semiconductor memory medium such as a flash memory or includes a memory medium in which data can be recorded magnetically or optically. The memory unit 6 stores, in a rewritable manner, various programs or a variety of information related to the control of the speech recognition apparatus 100. Moreover, the memory unit 6 stores therein a variety of information related to an FSA and stores the resultant FSA obtained by performing the determinization operation.

In this way, in the automaton determinization device according to the first embodiment, the states and transitions that need to be retained during the determinization operation decrease in number as compared to the conventional method. As a result, it becomes possible to perform the determinization with a smaller storage area as compared to the conventional method.

Second Embodiment

In the first embodiment, the configuration is such that equivalence among states is determined by referring to the transitions. In the automaton determinization device according to a second embodiment, the configuration is such that equivalence among states is determined by referring to the states in a similar manner to the conventional subset construction.

While determining equivalence among states by referring to the states, the 3-tuples (transition of link source, transition of link destination, weight) included in the set M according to the first embodiment are modified to 3-tuples (state of link source, state of link destination, weight) included in the set M. Moreover, the pseudo code is rewritten in the manner given below.

With reference to FIG. 4, the 21-st line is modified to $Q_s \leftarrow \{q_s | (q_s, q_d, w) \in M, q_d = q_n\}$ and the 22-nd line is modified to $M \leftarrow M \setminus \{(q_s, q_d, w) \in M | q_s \in Q_s\}$.

With reference to FIG. 5, the 10-th line is modified to $M \leftarrow M \cup \{q_{new}, q, \lambda(q_{new})^{-1}(\times)\lambda(q))\}$.

With reference to FIG. 6, the seventh and eighth lines are deleted. In between the 10-th and the 11-th lines are added following operations. When any 3-tuple included in the set M has $q_n$ as the first element, an operation (a) is performed. In any other case, an operation (b) is performed. In the operation (a), for all those 3-tuples included in the set M which have $q_n$ as the first element, the operation of $M \leftarrow M \cup \{(q_{new}, q_d, w_p^{-1}(\times)w_b(\times)w_d)\}$ is performed. Herein, for such 3-tuples, the second element is set to $q_d$ and the third element is set to $w_d$. The operation (b) points to $M \leftarrow M \cup \{(q_{new}, q_m, w_p^{-1}(\times)w_b)\}$. Meanwhile, in order to simplify the operations, it is also possible to perform only the operation (b), even though some equivalent states remain unfound. Meanwhile, the 13-th line is modified only to $E \leftarrow E \cup \{e_{new}\}$.

With reference to FIG. 7, the fifth and sixth lines are deleted.

The pseudo code in FIG. 8 is modified to the pseudo code in FIG. 19. At the first line, it is determined whether or not q is present in the set of first elements of the 3-tuples included in the set M. If q is present, then the operations from the second line to the ninth line are performed.

At the second line, in the set D are substituted the 2-tuples having the second element as $q_d$ and the third element as w of those 3-tuples included in the set M which have the first element $q_s$ equal to q.

At the third line, $Q_m$ is set as the first element of those 3-tuples included in the set M which have the second element equal to the first element $q_d$ of the 2-tuples included in the set D. The states included in the set $Q_m$ are the candidates for equivalent states of the state q. Whether or not the states included in the set $Q_m$ are equivalent to the state q is determined by the operations from the fifth line.

The fourth line indicates that the operations from the fifth line to the ninth line are performed for each of the state $q_m$ included in the set $Q_m$.

At the fifth line, in the set $D_m$ are substituted the 2-tuples having the second element as $q_d$ and the third element as w of those 3-tuples included in the set M which have the first element $q_s$ equal to $q_m$.

At the sixth line, it is determined whether or not the set D is identical to the set $D_m$. If the two sets are identical, the state q and the state $q_m$ are equivalent states. Thus, in order to delete or modify the transitions related to the state q, the operations from the seventh line to the ninth line are performed.

At the seventh line, the incoming transitions to the state q are substituted into the set $E_{in}$ and the outgoing transitions from the state q are substituted into the set $E_{out}$.

At the eighth line, the set $E_{out}$ is deleted from the set E; the next state of the set $E_{in}$ is modified to the state $q_m$; and the state q is deleted from the set Q.

Since the equivalent states are found and the state q is deleted, "true" is returned as the return value at the ninth line and the operations for the function reconnect are ended.

The 10-th line is processed in a case where no equivalent states are found. In that case, "false" is returned as the return value and the operations for the function reconnect are ended.

According to the method described above, even when the subset construction is used as the base, the number of states and transitions that are generated during the determinization operation can be reduced as compared to the conventional method. That is, the used storage area decreases as compared to the conventional method. In an identical manner to the first embodiment, the second embodiment can also be implemented for determinization of an acceptor, an FST, and a WFST. During determinization of an acceptor, the operations regarding the weights can be eliminated. During determinization of an FST or a WFST, it is only necessary to change the semiring of weights into the respective compatible semirings as described in the first embodiment.

Third Embodiment

In the first embodiment, it was stated that the determinization operation according to the first embodiment can also be implemented for an acceptor only by eliminating the operations regarding the weights. In a third embodiment, the explanation is given for an example of the determinization operation implemented for an acceptor.

An acceptor is configured as a 5-tuple (Q, E, Σ, I, F) including the set of states Q, the set of transitions E, the set of input symbols Σ, the set of initial states I, and the set of final states F. A transition is configured as a 3-tuple (previous state, input symbol, next state). In the first embodiment, the set M has 3-tuples as the elements. In contrast, in the third embodiment, the set M has 2-tuples (transition of link source, transition of link destination) as the elements.

In the third embodiment, the pseudo code is rewritten in the manner given below. With reference to FIG. 4, the 21-st line is modified to $E_s \leftarrow \{e_s|(e_s, e_d) \in M, e_d = E_n\}$ and the 22-nd line is modified to $M \leftarrow M \setminus \{(e_s, e_d) \in M | e_s \in E_s\}$.

With reference to FIG. 5, the fourth line is deleted. The seventh line is modified to $e_{new} \leftarrow (q_{new}, in(e), n(e))$. The 10-th line is modified to $M \leftarrow M \cup \{(e_{new}, e)\}$. The 12-th line is modified to $F \leftarrow F \cup \{q_{new}\}$.

With reference to FIG. 6, the second line and the 10-th line are deleted. The fourth line is modified to $F \leftarrow F \cup \{q_{new}\}$ and the fifth line is modified to $e_{det} \leftarrow (q, \sigma, q_{new})$. The seventh line is modified to $M_s \leftarrow \{(e_s, e_d) \in M | e_s \in E_o\}$, $M_d \leftarrow \{(e_s, e_d) \in M | e_d \in E_o\}$. The eighth line is modified to $M \leftarrow M \cup \{(e_{det}, e_d) | (e_s, e_d) \in M_s\} \setminus M_s \cup \{(e_s, e_{det}) | (e_s, e_d) \in M_d\} \setminus M_d$. The 12-th line is modified to $e_{new} \leftarrow (q_{new}, in(e), n(e))$. The 13-th line is modified to $E \leftarrow E \cup \{e_{new}\}$, $M \leftarrow M \cup \{(e_{new}, e_n)\}$.

With reference to FIG. 7, the third line is deleted. The fourth line is modified to $e_{det} \leftarrow (p(e), in(e), n(e))$. The fifth line is modified to $M_d \leftarrow \{(e_s, e_d) \in M | e_d \in E_o\}$. The sixth line is modified to $M \leftarrow (M \setminus M_d) \cup \{(e_s, e_{det}) | (e_s, e_d) \in M_d\}$.

In order to eliminate the operations regarding the weights, FIG. 8 is modified to FIG. 20. Since the weight coefficient ρ is absent, the determination regarding final states replaces the determination performed using the weight coefficient at the 10-th line. When the state q as well as the state $q_m$ is a final state or when neither the state q nor the state $q_m$ is a final state, $(q \in F) = (q_m \in F)$ holds true. However, if only one of the state q and the state $q_m$ is a final state, $(q \in F) = (q_m \in F)$ turns false.

According to the method described above, even in the case of an acceptor, the number of states and transitions that are generated during the determinization operation can be reduced as compared to the conventional method. Hence, the used storage area can be reduced as compared to the conventional method.

In this way, according to embodiments, the number of states and transitions that are generated during the determinization operation can be reduced as compared to the conventional method. That enables achieving reduction in the used storage area.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An automaton determinization method comprising:
   state-generating that includes
      generating a second state newly, when there are two or more first transitions that leave from a first state included in a finite state automaton and that are assigned with a first symbol;
   first-transition-generating that includes generating a second transition
      that leaves from the first state and enters to the second state and
      that is assigned with the first symbol;
   second-transition-generating that includes generating, with respect to each of the first transitions, a fourth transition in which a state previous to a third transition is substituted with the second state,
      the third transition being an outgoing transition from next states of the first transition; and first-deleting that includes
  deleting states that are next states to the first transitions in which the fourth transitions are generated and that do not have incoming transitions other than the first transitions,
  deleting outgoing transitions from the deleted states, and
  deleting the first transitions in which the fourth transitions are generated.

2. The method according to claim 1, further comprising:
first-associating that includes associating the third transitions with the fourth transitions;
second-associating that includes associating, when the first transitions are associated with other transitions at the time of generating the second transition at the first-transition-generating, the generated second transition with the other transitions;
determining, when two states included in the finite state automaton satisfy a predetermined criterion regarding transitions that are associated with outgoing transitions from the two states, that the two states are equivalent; and
connection-changing that includes changing connection of a next state of an incoming transition that is incoming to one of the two states determined to be equivalent to the other of the two states.

3. The method according to claim 2, wherein
the criterion points to a criterion that all transitions associated with an outgoing transition from one of the two states match with all transitions associated with an outgoing transition from the other of the two states.

4. The method according to claim 1, further comprising:
third-associating that associates a next state of the first state to the second state;
fourth-associating that includes associating, when next states of the first transitions are associated with other states at the time of generating the second state at the state-generating, the generated second state with the other states;
determining, when two states included in the finite state automaton satisfy a predetermined criterion regarding states that are associated with the two states, that the two states are equivalent; and
connection-changing that includes changing connection of a next state of an incoming transition that is incoming to one of the two states determined to be equivalent to the other of the two states.

5. The method according to claim 4, wherein
the criterion points to a criterion that all states associated with one of the two states match with all states associated with the other of the two states.

6. The method according to claim 1, wherein
the finite state automaton is a weighted finite state automaton, and
the automaton determinization method further comprising
weight-calculating that includes calculating a weight of the second transition that represents most appropriate weight calculated from weights of the first transitions by performing predetermined operations.

7. The method according to claim 6, further comprising:
fifth-associating that includes associating the third transitions with the fourth transitions and assigning weights of the fourth transitions to associations;
sixth-associating that includes associating, when the first transitions are associated with other transitions at the time of generating the second transition at the first-transition-generating, the generated second transition with the other transitions;
determining, when two states included in the weighted finite state automaton satisfy a predetermined criterion regarding transitions that are associated with outgoing transitions from the two states, that the two states are equivalent; and
connection-changing that includes changing connection of a next state of an incoming transition that is incoming to one of the two states determined to be equivalent to the other of the two states.

8. The method according to claim 7, wherein
the criterion points to a criterion that all transitions and all associating weights associated with an outgoing transition from one of the two states match with all transitions associated and all associating weights with an outgoing transition from the other of the two states.

9. The method according to claim 1, wherein
the finite state automaton is a finite state transducer, and
the automaton determinization method further comprises
symbol-sequence-calculating that includes calculating an output symbol sequence of the second transition that points to a symbol sequence of the longest common prefix of output symbol sequences of the first transitions.

10. The method according to claim 9, further comprising:
seventh-associating that includes
  associating the third transitions with the fourth transitions and
  assigning output symbols of the fourth transitions to associations;
eighth-associating that includes associating, when the first transitions are associated with other transitions at the time of generating the second transition at the first-transition-generating, the generated second transition with the other transitions;
determining, when two states included in the finite state transducer satisfy a predetermined criterion regarding transitions that are associated with outgoing transitions from the two states, that the two states are equivalent; and
connection-changing that includes changing connection of a next state of an incoming transition that is incoming to one of the two states determined to be equivalent to the other of the two states.

11. The method according to claim 10, wherein
the criterion points to a criterion that all transitions and all associating output symbol sequences associated with an outgoing transition from one of the two states match with all transitions and all associating output symbol sequences associated with an outgoing transition from the other of the two states.

12. The method according to claim 1, further comprising
second-deleting that includes deleting, at a predetermined frequency, states and transitions that are not reachable from an initial state.

13. The method according to claim 12, wherein, every time one of the state-generating, the first-transition-generating, the second-transition-generating, and the first-deleting is completed,
  the second-deleting includes deleting states and transitions that are not reachable from an initial state.

14. An automaton determinization device comprising:
a state generating unit configured to, when there are two or more first transitions that leave from a first state included in a finite state automaton and that are assigned with a first symbol, newly generate a second state;
a first transition generating unit configured to generate a second transition that leaves from the first state and enters to the second state and that is assigned with the first symbol;

a second transition generating unit configured to generate, with respect to each of the first transitions, a fourth transition that in which a state previous to a third transition is substituted with the second state, the third transition being an outgoing transition from a next state of the first transition; and a first deleting unit configured to delete states which are next states to the first transitions for in which the fourth transitions are generated and that do not have incoming transitions other than the first transitions, delete outgoing transitions from the deleted states, and delete the first transitions in which the fourth transitions are generated.

15. A computer program product comprising a computer-readable medium including programmed instructions for automaton determinization, wherein the instructions, when executed by a computer, cause the computer to perform:

state-generating that includes generating, when there are two or more first transitions that leave from a first state included in a finite state automaton and that are assigned with a first symbol, a second state newly;

first-transition-generating that includes generating a second transition that leaves from the first state and enters to the second state and that is assigned with the first symbol;

second-transition-generating that includes generating, with respect to each of the first transitions, a fourth transition in which a state previous to a third transition is substituted with the second state, the third transition being an outgoing transition from a next state of the first transition; and first-deleting that includes deleting states that are next states to the first transitions in which the fourth transitions are generated and that do not have incoming transitions other than the first transitions, deleting outgoing transitions from the deleted states, and deleting the first transitions in which the fourth transitions are generated.

* * * * *